United States Patent [19]

Davies et al.

[11] Patent Number: 5,082,812

[45] Date of Patent: Jan. 21, 1992

[54] PROCESS FOR THE MANUFACTURE OF ELECTROCERAMICS SUCH AS TITANATES AND ZIRCONATES

[75] Inventors: Julian A. Davies; Sylvain Dutremez, both of Toledo, Ohio

[73] Assignee: The University of Toledo, Toledo, Ohio

[21] Appl. No.: 449,570

[22] Filed: Dec. 12, 1989

[51] Int. Cl.$^5$ .................... C04B 35/46; C04B 35/48
[52] U.S. Cl. .................... 501/137; 501/135; 423/598; 264/63
[58] Field of Search ............... 501/137, 138; 423/598

[56] References Cited

U.S. PATENT DOCUMENTS

| | | | |
|---|---|---|---|
| 2,218,655 | 10/1940 | Peterson | 23/51 |
| 2,751,279 | 6/1956 | Merker | 23/51 |
| 2,758,911 | 8/1956 | Lynd et al. | 23/51 |
| 2,964,413 | 12/1960 | Merker | 106/39 |
| 2,985,506 | 5/1961 | DiVita et al. | 23/51 |
| 3,231,328 | 1/1966 | Pechini | 23/51 |
| 3,637,531 | 1/1972 | Faxon et al. | 252/520 |
| 3,755,553 | 8/1973 | Kutolin et al. | 423/598 |
| 3,993,740 | 11/1976 | Saito et al. | 423/598 |
| 4,520,004 | 5/1985 | Uedaira et al. | 423/598 |
| 4,636,378 | 1/1987 | Pastor et al. | 423/598 |
| 4,677,083 | 6/1987 | Uedaira et al. | 423/598 |
| 4,764,493 | 8/1988 | Lilley et al. | 501/137 |
| 4,946,810 | 8/1990 | Heistand et al. | 423/598 |

OTHER PUBLICATIONS

"Synthesis and Properties of Barium Titanate Powder Derived from a Catechol Complex", N. J. Ali and J. Milne, Br. Ceram. Trans. J., 86, 113–117, 1987.

Uber Innerkomplexe Brenzcatechinate Vierwertiger Elemente by Rosenheim, Raibmann & Schendel, Zeitschrift fur Anorganische und Allgemeine Chemie., Band 196, 1931 p. 160.

Synthetic, Structural & Physical Studies of Titanium Complexes of Catechol & 3,5-Di-tert-butylcatechol by Borgias, Cooper, Yun Bai Koh, & Raymond in Inorganic Chemistry, 1984, 23, 1009–1016.

Kolthoff et al. Treaties on Analytical Chemistry vol. 5, p. 16 1961.

Primary Examiner—William R. Dixon, Jr.
Assistant Examiner—C. Melissa Bonner
Attorney, Agent, or Firm—Willian Brinks Olds Hofer Gilson & Lione

[57] ABSTRACT

Mixed metal oxide electroceramics are produced from dissolved metal oxides using aqueous processing. For example, zirconates and titanates are manufactured from titania and zirconia using aqueous processing by forming an ammonium titanium complex, or an ammonium zironium complex, which can then be further reacted to release ammonia and form a metal titane or metal zirconate precursor. The precursor is then pyrolyzed to the corresponding oxide, e.g. barium and/or strontium titanate.

35 Claims, No Drawings

PROCESS FOR THE MANUFACTURE OF ELECTROCERAMICS SUCH AS TITANATES AND ZIRCONATES

TECHNICAL FIELD

The present invention relates to methods for producing electroceramics and more specifically to electroceramics which exhibit ferroelectric or other useful properties. The present invention is especially directed towards the formation of barium titanate and zirconate and to the formation of strontium titanate and zirconate.

BACKGROUND ART

Barium titanate and zirconate, as well as strontium titanate and zirconate are well-known electroceramic materials possessing useful properties such as ferroelectric or piezoelectric properties. Because of their properties certain of these materials have been employed as capacitors, voltage surge suppressors in computers, and as hydrostatic piezoresistive sensing materials. They are commonly employed in motors and as transducers in audio equipment, especially speaker components. These materials can also be used as refractories for high temperature applications, as pigments and in catalytic applications. In the past, the various available processes for making such materials involved a trade-off between production costs and purity. That is, one could either practice a reasonably economic process but produce a relatively impure or contaminated material or one could obtain a material of rather high purity by an expensive process. As an example, barium titanate can be manufactured from titania and barium carbonate by a simple heating process at elevated temperatures. Such a process is reasonably inexpensive but, unfortunately, the ultimate barium titanate material is not of the best quality from a purity point of view. Alternatively, a reasonably high purity material can be obtained by employing titanium tetrachloride as a starting material. Unfortunately, however, because of the rapid hydrolysis of titanium tetrachloride, this material needs to be processed in organic solvents. Organic solvents, of course, may not only create toxicity problems during production but are also more expensive than an aqueous system. Consequently, the use of $TiCl_4$ results in a rather expensive process although a relatively high purity material is obtainable. Since $TiCl_4$ is highly hydrolyzable it, consequently, cannot be cheaply and conveniently stored for prolonged periods of time. This, of course, has its adverse economic penalties. If a titanium compound, or intermediate, could be found and used which is not of such a high reactivity, it would be a financial benefit in the production of, for example, titanates.

Thus, it will be seen that there is a need in the art for a process for forming titanate and zirconate materials which does not involve the use of organic solvents and which would use water. There is likewise a need for a process which uses inexpensive, stable starting materials and in which the chemical intermediates are stable and easily storable.

In accordance with the present invention, the problems and the needs in the art are satisfied by providing a process for economically producing high purity materials. The process is practiced in an aqueous medium and thereby precludes the necessity for using organic solvents. It uses cheap, stable and readily available starting materials. Additionally, during the process, an intermediate is formed which can be stored for prolonged periods of time and which is not easily susceptible, unlike titanium tetrachloride, to rapid hydrolysis when in contact with humid air.

DISCLOSURE OF THE INVENTION

In accordance with one feature of this invention a process is provided for forming a compound of the formula $AMO_3$ wherein A is barium or strontium or a combination thereof, and M is titanium or zirconium comprising the steps of:

(i) reacting an aqueous acidic solution of a compound of the formula $MO_2$ with a reactive aqueous solution formed by combining ammonium hydroxide and an ammonium hydroxide soluble aromatic compound having two adjacent carbon atoms which each bear groups which contain labile hydrogen atoms, the remaining carbon atoms of said aromatic compound containing hydrogen or an unreactive substituent, said reacting being done so as to form a solution containing an organo titanium ammonium compound or an organo zirconium ammonium compound which is reactable with an $A(OH)_2$ compound, (ii) reacting a solution of said organo titanium ammonium compound or said organo zirconium ammonium compound with an aqueous solution of one or more hydroxides of the formula $A(OH)_2$ so as to form a pyrolyzable organic precursor of said $AMO_3$ compound and (iii) pyrolyzing said precursor to form said compound of the formula $AMO_3$.

In accordance with another feature of this invention a process is provided which comprises reacting an aqueous acidic, clear solution of zirconia or titania with a reactable combination of ammonium hydroxide and an aromatic compound having a —OH substituent on a first carbon atom and an adjacent carbon atom having a —OH or a —COOH group, the remaining carbon atoms containing either hydrogen or a non-reactive substituent, said reacting being done so as to form a barium hydroxide or strontium hydroxide reactable, ammonium zirconium organic compound or ammonium titanium organic compound. Such organic compounds can then be reacted with barium hydroxide or strontium hydroxide or a mixture thereof, liberating free ammonia, to thereby form a precursor which can be pyrolyzed to form the desired titanate or zirconate.

In accordance with another feature of this invention a process is provided which comprises reacting $Ba(OH)_2$ or $Sr(OH)_2$, or a mixture thereof, with a compound of the formula $(NH_4)_m [M(ArO_2)_n] \cdot x\, H_2O$ in an aqueous medium, wherein M is Ti or Zr and n is 3 or 4, m is 2 or 4, and x represents the number of moles of water of hydration and Ar is an arylene radical, so as to liberate $NH_3$, and form a titanate or zirconate precursor, and pyrolyzing said precursor to form a high purity zirconate or titanate. When M is Ti, m will be 2, n will be 3, and x will be 2. Values of m will be 2 or 4, n will be 3 or 4 and x may be between 0 and about 25 when M is Zr.

In addition to the benefits noted above it will be readily apparent that the starting materials for the zirconates and titanates which are to be formed in accordance with the present invention, are titania, either rutile or anatase, and zirconia. Those skilled in the art recognize that these are inexpensive sources of titanium and zirconium.

In accordance with a broader aspect of this invention, a process is provided for forming an inorganic oxide. The process comprises reacting an aqueous solution of a dissolved metal oxide with a metal oxide-reactable combination of ammonium hydroxide and an aromatic compound having an —OH substituent on a first carbon atom and an adjacent carbon atom having a —OH or a —COOH group with the remaining carbon atoms containing either hydrogen or an unreactive substituent, the reacting being done so as to form an ammonium metallo aromatic compound in which the ammonium ions can be chemically replaced by a metal cation from a metal cation source. The ammonium ions are then replaced by reacting the ammonium metallo aromatic compound in an aqueous medium with a metal cation source so as to form a decomposable aromatic compound containing both the metal moiety of the metal oxide and the metal cation from the metal cation source. That compound is then decomposed to obtain an inorganic oxide of the metal and metal cation. Exemplary of the metal oxides are titanium oxide, zirconium oxide, bismuth oxide, copper oxide, tin oxide, iron oxide, and mixtures thereof. When employing bismuth oxide, nitric acid will desirably be employed to form a starting solution. Outstanding results will be obtained by dissolving the other metal oxides in a sulfuric acid and ammonium sulfate solution. Sources for the metal cation will generally be hydroxides or nitrates, e.g. barium hydroxide, strontium hydroxide, or lead nitrate as well as mixtures thereof.

The aromatic compound employed has a —OH substituent on a first carbon atom and an adjacent carbon atom has either a —OH or a —COOH group on it. The remaining carbon atoms bear hydrogen or a non-reactive substituent. Examples of non-reactive substituents include for instance the halides, especially chlorine, alkyl groups, for example $C_1$ to $C_5$ alkyl groups but especially alkyl groups containing one to three carbon atoms, as well as other unreactive groups like aromatic substituents and sulfonates. Aromatic compounds having six to fourteen carbon atoms will produce fine results. Of course, it will be apparent to those skilled in the art that the substitution on the aromatic compound cannot be so extensive as to sterically hinder the reactability of the two adjacent hydroxyl substituents or the adjacent hydroxyl and carboxyl substituents.

DETAILED DESCRIPTION OF THE INVENTION INCLUDING THE BEST MODE OF CARRYING IT OUT

In accordance with a preferred embodiment of the invention an aromatic diol, or a hydroxyl substituted aromatic carboxylic acid, is employed to react with ammonium hydroxide, the functional groups being on adjacent carbon atoms. This reaction is preferably effected in deaerated concentrated ammonium hydroxide solution and is exemplified by the equation set forth below as (i) wherein Ar designates an arylene radical, i.e., a bivalent radical having a benzene ring, fused or unfused, as a core or nucleus. Since, as indicated above, one of the OH groups in equation (i) can be on a carboxyl group, it will be apparent that one of the open bonds in the arylene radical (Ar) can be the result of a carbonyl group.

The ammonium aromatic compound formed in equation (i) is then reacted, again in accordance with a preferred embodiment of the invention, with titanium dioxide or zirconium dioxide. This reaction, equation (ii), is done in an aqueous solution, the titania or zirconia having first been transformed into a clear aqueous solution by dissolving them in a concentrated sulfuric acid solution containing ammonium sulfate. In equation (ii), x of course represents water of hydration. The product of equation (ii), namely $(NH_4)_m [M(ArO_2)_n] \cdot x\ H_2O$, is, unlike titanium or zirconium tetrachloride, a very stable material which can be stored for prolonged periods of time, thereby providing for convenient use at a later time to react, for example, with barium and/or strontium hydroxide as set forth in equation (iii) below. As indicated, m is 2 and n is 3 when M is Ti and when m will be 2 or 4 and n will be 3 or 4 M is Zr. In practicing the present process and although not shown in equation (iii) below, the reaction by-product is $NH_3$, which of course is easily removed from the reaction mass. The compound containing the desired metal values, i.e., Ti or Zr and Ba and/or Sr, is in solution thereby allowing for convenient removal of impurities by simple filtration. The final reaction of this invention is represented by equation (iv) below, wherein the intermediate metallic aromatic compound is then pyrolyzed or decomposed to produce, for example, barium titanate, barium zirconate, strontium titanate, or strontium zirconate or the mixed barium-strontium titanates or zirconates.

In accordance with practicing the best mode of this invention the carbon atoms of the aromatic compound, except for the adjacent hydroxyl and carboxyl groups, or the two adjacent hydroxyl groups, will be bonded to hydrogen and will be free of any substituents. Representative of the best aromatic compounds are ortho-dihydroxybenzene, 2,3-dihydroxynaphthalene and ortho-hydroxybenzoic acid. In other words, the preferred and best Ar radicals in the above equations are ortho-phenylene, a 2,3 naphthalene radical or the divalent radical set forth immediately below.

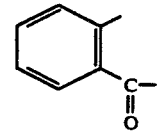

Generally the aromatic compound employed herein can be a compound of the formula:

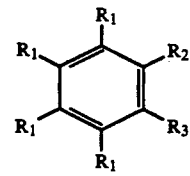

wherein $R_2$ and $R_3$ are either a carboxyl group or a hydroxyl group but with at least one of $R_2$ and $R_3$ being the hydroxyl group and where each $R_1$ is independently either hydrogen or an unreactive substituent like those previously noted.

The aromatic compound, likewise, can be a naphthalene compound, for example a naphthalene compound with one carbon atom being bonded to a hydroxyl group and an adjacent carbon atom bearing a hydroxyl or a carboxyl group and the remaining carbon atoms being bonded to either hydrogen or an inert substituent such as, for example, an alkyl or halide substituent. A preferred naphthalene aromatic radical is the bivalent naphthalene radical having the two open valences at the 2 and 3 positions. Graphically the aromatic compound may be of the formula

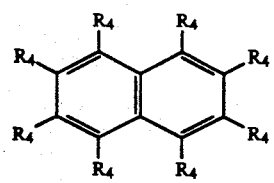

wherein one $R_4$ is hydroxyl and an adjacent $R_4$ is carboxyl or hydroxyl and wherein each remaining $R_4$ is independently selected from hydrogen or an unreactive substituent.

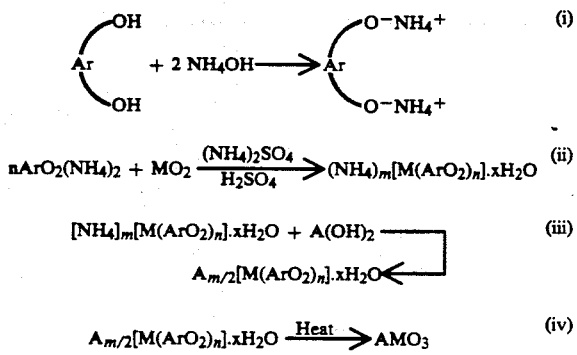

As indicated above, a clear solution of the metal oxide materials contemplated for use herein is prepared with sulfuric acid, preferably concentrated sulfuric acid, i.e., 96% as sulfuric acid, and ammonium sulfate or with nitric acid. An aqueous solution is formed by heating generally at a temperature between about 400°–500° C. While the amounts of the materials may vary, it is generally preferred, for example, to employ for each $1.254 \times 10^{-2}$ mole of metal oxide, e.g. titanium dioxide or zirconium dioxide, approximately 0.72 mole of $H_2SO_4$ and 0.12 mole of ammonium sulfate.

The aqueous solution of the aromatic compound and ammonium hydroxide is prepared by, preferably, first of all deaerating concentrated ammonium hydroxide (29.6% by weight of ammonia). The deaerating is done by bubbling argon, or nitrogen, through the solution followed by the addition of the aromatic compound. The amount of ammonium hydroxide of course will, first of all, be the amount needed to neutralize the $H_2SO_4$ which is employed in solubilizing the $MO_2$ material and then an additional substantial excess for reaction with the aromatic compound. It will generally be found desirable to employ approximately 6.32 moles of concentrated ammonium hydroxide solution and 0.0375 mole of the aromatic compound for approximately 0.0125 mole of titania or zirconia.

The formation of the ammonium titanium or ammonium zirconium aromatic compound is generally effected by controllably adding the titania or zirconia solution to a reaction vessel, chilled in ice, to maintain the temperature generally between about 0° and 5° C. The reaction is exothermic and the mixture is then allowed to react for about 4 hours at room temperature, followed by filtration. These compounds are then reacted with the barium and/or strontium hydroxides and the reaction product recovered and thermally decomposed in the presence of oxygen (air) to the corresponding titanates or zirconates.

While the above is deemed sufficient to enable those skilled in the art to make and use the present invention, nonetheless further exemplification follows. It should be understood that these are examples and are not to be construed as limiting the present invention.

EXAMPLE 1

Preparation of $BaTiO_3$

An aqueous, clear, colorless solution was prepared from titanium dioxide (either rutile or anatase) by combining 1 gram of titania (0.012 mole) with 16 grams of ammonium sulfate (0.12 mole) and 40 mL of concentrated (96%) sulfuric acid (0.72 mole of $H_2SO_4$). The ingredients were boiled together at a temperature of about 400°–500° C. in a glass flask overnight. A clear yellow solution was formed which upon cooling to room temperature became colorless. One hundred and twenty (120) mL of distilled water were then added to the solution.

A basic (ammoniacal) solution was prepared by first of all deaerating a concentrated aqueous ammonium hydroxide (29.6% by weight) solution. This was effected by bubbling argon (or nitrogen) through the solution. About 4.134 grams (0.03755 mole) of catechol (ortho-dihydroxybenzene) were added to 400 mL of the aqueous, deaerated, concentrated ammonium hydroxide solution.

The titanium dioxide solution, as produced above, was then controllably added over about a 5-minute period to the basic catechol solution produced above while the latter was in a flask which was externally chilled in ice. Sufficient ammonium hydroxide was present to neutralize the $H_2SO_4$ and to provide a substantial stoichiometric excess. The excess here was about 4.9 moles as $NH_3$. The addition rate was such as to generally maintain the temperature, during addition, in the range of about 2 to about 5° C. The flask was then removed from the ice bath and the mixture was stirred under a flowing atmosphere of nitrogen or argon for about 4 hours at room temperature. The reaction is exothermic and no heating was required with the reaction mass coming to room temperature over this period. A rust colored solid was formed and this material was separated by filtration and allowed to dry overnight. This solid ammonium titanium aromatic compound was analyzed by infrared spectroscopy, proton NMR spectroscopy, solution and solid state carbon NMR spectroscopy, electronic spectroscopy, mass spectrometry, cyclic voltammetry, thermogravimetric analysis, combustion analysis for C, H, and N, X-ray fluorescence analysis for Ti, and by single crystal X-ray diffraction. This testing showed the material to be an ammonium titanium catecholate of the composition $[NH_4]_2 [Ti(C_6H_4O_2)_3] \cdot 2H_2O$. This material was typically obtained in approximately 86–90% yield (based on titanium).

The theoretical carbon content for the ammonium titanium catecholate of the above formula is about 48.66%, the theoretical hydrogen is about 5.54%, the theoretical nitrogen is about 6.31% and theoretical titanium would be about 10.78% by weight. Elemental analysis showed the titanium content of the product to be about 11.01%, and the carbon content to be between about 47.80% to about 47.89%, the actual hydrogen content being between about 5.35% to about 5.39%, and the actual nitrogen content being between about 6.60% to about 6.62% by weight. Additionally, elemental analysis was made for sulfur to see if there was any sulfate impurity. The theoretical value, of course, should be 0% and by actual analysis the sample showed 0% by weight of sulfur. Thus it will be seen that there is very good agreement between the theoretical values and the actual values.

Barium titanium catecholate was then prepared. This was done by dissolving 0.4105 gram ($9.2395 \times 10^{-4}$ mole) of the ammonium titanium catecholate in 50 mL of distilled water and then adding 0.2912 gram ($9.230 \times 10^{-4}$ mole) of barium hyroxide octahydrate. The mixture was heated for 2 hours at about 60°–70° C. and then allowed to cool to room temperature. Insoluble material, that is impurities, can be removed by filtration as needed. A basic, clear, brown aqueous solution of the barium titanium catecholate complex results and the product was obtained by evaporation under reduced pressure (1 mm Hg) at room temperature. Analysis by infrared spectroscopy, proton and carbon NMR spectroscopies, cyclic voltammetry, thermogravimetric analysis, combustion analysis for C, H, and N, and X-ray fluorescence analysis for Ti showed the product to be Ba [Ti ($C_6H_4O_2$)$_3$].3H$_2$O. The hydrated barium titanium catecholate was typically obtained in 70–75% yield based on barium. An elemental analysis showed the titanium to be present in an amount of about 8.39% by weight whereas the theoretical value was 8.5%, the carbon to be present in an amount of about 38.34% compared to the theoretical value of 38.36% and the hydrogen to be present in an amount of about 3.01% compared to the theoretical value of 3.22%. This obviously shows good agreement. Nitrogen was also analyzed and while the theoretical value is zero the sample showed slight impurities remaining in that the nitrogen level was about 0.5% by weight.

The barium titanium catecholate was then heated at a temperature and for a time sufficient to pyrolyze the material and remove carbon and hydrogen. In this case, approximately 0.0959 gram of the barium titanium catecholate was heated at a temperature of about 800° C. for 14 hours in air to produce 0.0368 gram of barium titanate. The yield was 100% and X-ray powder diffraction analysis showed the material to be barium titanate ($BaTiO_3$).

In further testing the above procedure was generally employed using 2,3-dihydroxynaphthalene and ortho-hydroxybenzoic acid. When using ortho-hydroxybenzoic acid a substantial molar excess should be employed, e.g. ten times the molar amount of catechol used in Example 1. These materials produce substantially identical results as those obtained with the ortho-dihydroxybenzene employed in Example 1.

EXAMPLE 2

Preparation of Strontium Titanate

The procedures of Example 1 were employed to produce a clear, colorless aqueous solution of titania in a concentrated sulfuric acid—ammonium sulfate medium. Those procedures were also repeated to produce the dihydrate of ammonium titanium catecholate.

The procedures of Example 1 were then generally employed to produce a strontium titanium catecholate but 0.5228 gram ($1.177 \times 10^{-3}$ mole) of the ammonium titanium catecholate was employed and, instead of employing 0.2912 gram of barium hydroxide octahydrate, strontium hydroxide octahydrate was employed in an amount of 0.3145 gram ($1.183 \times 10^{-3}$ mole). A clear solution was likewise obtained from which the strontium titanium catecholate was isolated by evaporation under reduced pressure and at room temperature. Analysis using the tests set forth in Example 1 shows this material to be a compound of the formula Sr [Ti ($C_6H_4O_2$)$_3$].3H$_2$O. The theoretical carbon content for such a compound is about 42.07% whereas actual analysis showed the carbon content to be about 41.27%. Theoretical hydrogen content is 3.53% whereas actual analysis showed 3.37%. Theoretical nitrogen content is zero but actual analysis showed about 1.98% thereby indicating a slight impurity level. Theoretical titanium content is 9.32% whereas actual titanium analysis showed 9.43%. Again the theoretical and actual values obtained by elemental analysis show good agreement.

EXAMPLE 3

Preparation of Mixed Titanate

The following procedure was employed to form a mixed barium and strontium titanate and demonstrates the ability to dope barium titanate with strontium. Those skilled in the art recognize the significance of this in that it shows an easy technique to lower the Curie temperature by increasing the strontium level.

The procedure of Example 1 was substantially followed with the exception that 0.6312 gram ($1.42 \times 10^{-3}$ mole) of the hydrated ammonium titanium catecholate was employed and 0.2245 gram ($7.1 \times 10^{-4}$ mole) of barium hydroxide octahydrate was employed along with 0.188 gram ($7.1 \times 10^{-4}$ mole) of strontium hydroxide octahydrate. It will thus be seen that an attempt was made to form a compound of the formula $Ba_{0.5}Sr_{0.5}TiO_3$. Analysis of the final material, however, showed it to be a compound of the formula $Ba_{0.4}Sr_{0.6}TiO_3$.

EXAMPLE 4

Example 1 was substantially duplicated except that $BaCO_3$ was employed instead of barium hydroxide octahydrate. The barium carbonate was employed in a molar amount substantially equal to the molar amount of ammonium titanium catecholate employed. After the barium carbonate was added and the mixture heated for 2 hours at 60°–70° C., it was allowed to cool to room temperature. The reaction mass was then filtered, with the intention of separating out solid impurities, and the filtrate processed to obtain the barium titanium catecholate. No barium titanium catecholate could be recovered from the filtrate. There was no reaction using the barium carbonate and the barium carbonate was separated as a solid during the filtration step leaving a solution of unreacted ammonium titanium catecholate. In the two-stage reaction scheme of Ali and Milne (as reported in Br. Ceram. Trans. J., 86, 113–117, 1987) barium carbonate is operative as a reactant. That scheme is, of course, significantly different from that of the present invention.

In further experimentation, Example 1 was substantially duplicated employing such alcohols as ethylene glycol, propylene glycol, phenol and meta-dihydroxybenzene. These materials were inoperative for purposes of the present invention. No ammonium titanium organic compound could be formed from these alcohols which, in turn, could be converted to barium or strontium material.

EXAMPLE 5

Preparation of Barium Zirconate

A solution was first prepared by combining 1.5451 grams of zirconia ($1.254 \times 10^{-2}$ mole), 16.0 grams of ammonium sulfate and 40 mL of concentrated sulfuric acid. As in Example 1, the materials were boiled together until a clear aqueous solution was formed. The aqueous solution was then allowed to cool to room temperature and 120 mL of distilled water were added leaving a clear aqueous solution.

A basic ammonium organic compound was formed by adding 4.6895 grams ($4.259 \times 10^{-2}$ mole) of catechol to 400 mL of deaerated, concentrated ammonium hydroxide solution.

The dissolved zirconia aqueous solution was then added over about a 5-minute period to the ammoniacal catechol solution while the latter was chilled in ice. The reaction is exothermic. After removing the ice the mixture was then stirred under an atmosphere of nitrogen (or argon) for four hours. During this period it is at about room temperature. The reaction mass was then filtered to recover the ammonium zirconium catecholate as a grey-colored solid. The solid was allowed to air-dry overnight and was then analyzed by infrared spectroscopy, solid-state carbon NMR spectroscopy, mass spectrometry, thermogravimetric analysis, combustion analysis for C, H, and N, X-ray fluorescence analysis for Zr. The analysis shows the material to be an ammonium zirconium catecholate.

In order to prepare barium zirconate about 0.500 gram of the ammonium zirconium catecholate ($8.057 \times 10^{-4}$ mole) and 0.2542 gram ($8.057 \times 10^{-4}$ mole) of barium hydroxide octahydrate are boiled together in about 50 mL of distilled water for twenty-four hours and are then allowed to cool to room temperature. The solution is then evaporated to dryness under reduced pressure at room temperature. The resulting solid material is then heated at about 800° C. for about fifteen hours in air to produce about 0.223 gram of barium zirconate.

Lead titanates and zirconates are formed by the above techniques using lead nitrate as the source of lead cations. In lieu of zirconates and titanates, other compounds may easily be formed by following the above procedures but using the oxides of Bi, Cu, Sn or Fe, instead of titania or zirconia. Further exemplification follows.

EXAMPLE 6

Preparation of Lead Titanate

The procedures of Example 1 were employed to produce a clear, colorless aqueous solution of titania in a concentrated sulfuric acid-ammonium sulfate medium. Those procedures were also repeated to produce the dihydrated of ammonium titanium catecholate.

To produce an organic compound which will pyrolyse to form lead titanate, 0.2852 gram ($6.42 \times 10^{-4}$ mole) of the ammonium titanium catecholate and 0.2129 gram ($6.43 \times 10^{-4}$ mole) of lead nitrate are mixed together and 100 mL of distilled water are added. A yellow suspension is formed which is stirred first at room temperature for 20 minutes and then at 69° C. for two hours. During this time the color of the suspension changes from yellow to green/brown. The suspension is allowed to cool to room temperature and is filtered to produce the desired organic compound as a solid. The solid is allowed to dry in the air and heated at 800° C. to produce a white solid shown by X-ray diffraction to be lead titanate. The yield of lead titanate produced based upon the amount of titania is approximately 79%.

EXAMPLE 7

Preparation of Barium Bismuthate

An aqueous, clear, solution was prepared from bismuth oxide, $Bi_2O_3$, by dissolving 10.0146 grams of the oxide ($2.149 \times 10^{-2}$ mole) in 40 mL of concentrated nitric acid at room temperature. One hundred and twenty (120) mL of distilled water were then added to the solution.

The procedures of Example 1 were then employed to produce 400 mL of a basic (ammoniacal) catechol solution utilizing 14.2004 grams (0.129 mole) of catechol.

The bismuth oxide solution, as produced above, was then controllably added over about a 10-minute period to the basic catechol solution, as produced above. The mixture was stirred under a flowing atmosphere of nitrogen or argon for about 20 minutes at room temperature. A yellow-colored solid is formed during this time. Next, 13.55 grams of barium hydroxide octahydrate ($4.298 \times 10^{-2}$ mole) are added and the mixture stirred for 24 hours at room temperature. The solution is then evaporated to dryness under reduced pressure at room temperature. The resulting solid material is then heated at about 800° C. in air for about fifteen hours to produce about 16.95 grams of barium bismuthate.

EXAMPLE 8

Preparation of Lead Bismuthate

The procedures of Example 7 are exactly duplicated except that 14.23 grams of lead nitrate ($4.298 \times 10^{-2}$ mole) are used instead of the 13.55 grams of barium hydroxide octahydrate. The method produces about 19.95 g of lead bismuthate.

While the above describes the present invention with sufficient particularity to enable those skilled in the art to make and use same and discloses the best mode, it will of course be apparent that modifications are possible which pursuant to the patent statutes and laws do not depart from the spirit and scope thereof.

We claim:

1. A process for forming a compound of the formula $AMO_3$ wherein A is barium or strontium or a combination thereof, and M is titanium or zirconium, comprising the steps of:

(i) combining an aqueous acidic solution of a dissolved compound of the formula $MO_2$ with a reactive aqueous solution formed by combining ammonium hydroxide and an ammonium hydroxide soluble aromatic compound having two adjacent carbon atoms which contain groups bearing labile hydrogen atoms, the remaining carbon atoms of said aromatic compound being bonded to hydrogen or an unreactive substituent, and reacting the combination so as to form an organo titanium ammonium compound or an organo zirconium ammonium compound which is reactable with an $A(OH)_2$ compound, (ii) reacting in an aqueous solution, said organo titanium ammonium compound or said organo zirconium ammonium compound with one or more hydroxides of the formula $A(OH)_2$ so as to form a pyrolyzable organic precursor of said $AMO_3$ compound and (iii) pyrolyzing said precursor to form said compound of the formula AMO$_3$.

2. The process of claim 1 wherein said aqueous acidic solution is formed by dissolving said MO$_2$ compound in an aqueous sulfuric acid solution containing ammonium sulfate.

3. The process of claim 2 wherein said MO$_2$ compound is titania.

4. The process of claim 2 wherein said MO$_2$ compound is zirconia.

5. The process of claim 1 wherein said aromatic compound has an —OH substituent on a first carbon atom and an adjacent carbon atom has either an —OH substituent or a —COOH substituent.

6. The process of claim 1 wherein said other carbon atoms are bonded to hydrogen.

7. The process of claim 1 wherein said aromatic compound is ortho-dihydroxybenzene.

8. The process of claim 1 wherein said aromatic compound is 2,3-dihydroxynaphthalene.

9. The process of claim 1 wherein said aromatic compound is ortho-hydroxybenzoic acid.

10. The process of claim 1 wherein said aromatic compound is a compound of the formula

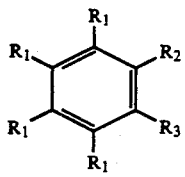

wherein R$_2$ and R$_3$ are either a carboxyl group or a hydroxyl group but with at least one of R$_2$ and R$_3$ being a hydroxyl group and wherein each R$_1$ is independently hydrogen or a non-reactive substituent.

11. The process of claim 1 wherein said aromatic compound is a naphthalene compound having two adjacent carbon atoms each substituted with a hydroxyl group and the remaining carbon atoms being bonded to hydrogen or a unreactive substituent.

12. The process of claim 1 wherein said aromatic compound is a naphthalene compound with one ring-carbon atom bearing a hydroxyl group and an adjacent ring-carbon atom bearing a hydroxyl or a carboxyl group, the remaining ring-carbon atoms bearing either hydrogen or an inert substituent.

13. The process of claim 1 wherein said aromatic compound is a compound of the formula

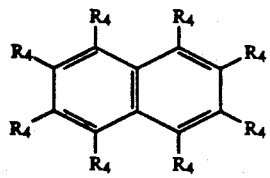

wherein one R$_4$ is hydroxyl and an adjacent R$_4$ is carboxyl or hydroxyl and wherein each remaining R$_4$ is independently selected from hydrogen or an unreactive substituent.

14. A process comprising reacting an in aqueous medium, zirconia or titania which has been dissolved in sulfuric acid and ammonium sulfate with a reactable combination of ammonium hydroxide and an aromatic compound having an —OH substituent on a first carbon atom and an adjacent carbon atom having an —OH or a —COOH group, the remaining carbon atoms bearing either hydrogen or an unreactive substituent, said reacting being done so as to form a barium hydroxide or strontium hydroxide-reactable ammonium zirconium organic compound or ammonium titanium organic compound.

15. The process of claim 14 and further including the step of reacting, in an aqueous medium, barium hydroxide or strontium hydroxide or a mixture thereof with said ammonium zirconium organic compound or said ammonium titanium organic compound so as to liberate NH$_3$ and pyrolyzing the reaction product to form either barium zirconate, strontium zirconate, barium titanate, strontium titanate, barium-strontium zirconate or a barium-strontium titanate.

16. The process of claim 14 wherein said aromatic compound contains 6 to 14 carbon atoms.

17. The process of claim 15 wherein said aromatic compound is selected from the group consisting of ortho-dihydroxybenzene, ortho-hydroxybenzoic acid, and 2,3-dihydroxynaphthalene.

18. A process comprising reacting Ba(OH)$_2$ or Sr(OH)$_2$ or a mixture thereof with a compound of the formula (NH$_4$)$_m$[M(ArO$_2$)$_2$]·xH$_2$O in an aqueous medium, wherein M is Ti or Zr, m is 2 or 4, n is 3 or 4, x is the number of molecules of water of hydration and Ar is an arylene radical, so as to liberate NH$_3$ and form a titanate precursor of the formula A[Ti(ArO$_2$)$_3$]·XH$_2$(, wherein A is barium or strontium or a combination thereof, or a zirconate precursor, and pyrolyzing said precursor to form a high purity zirconate or titanate.

19. The process of claim 18 wherein said Ar radical is o-phenylene or a 2,3-naphthalene radical or a

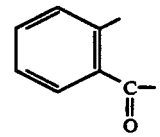

radical.

20. The method of claim 18 wherein Ar is o-phenylene, M is Ti, m is 2, n is 3, and x is 2.

21. The process for forming an inorganic oxide comprising reacting an aqueous solution of a dissolved metal oxide with a metal oxide-reactable combination of ammonium hydroxide and an aromatic compound having an —OH substituent on a first carbon atom and an adjacent carbon atom having an —OH or a —COOH group, with the remaining carbon atoms containing either hydrogen or an unreactive substituent, said reacting being done so as to form an ammonium metallo aromatic compound in which the ammonium ions can be chemically replaced by a metal cation from a metal cation source, and, then, replacing the ammonium ions by reacting in an aqueous medium said ammonium metallo aromatic compound with a metal cation source so as to form a decomposable aromatic compound containing both the metal moiety of said metal oxide and the metal cation from said metal cation source, and decomposing said compound to obtain an inorganic oxide of said metal and metal cation.

22. The process of claim 21 wherein said metal oxide is titanium oxide, zirconium oxide, bismuth oxide, copper oxide, tin oxide, iron oxide, or mixtures thereof.

23. The process of claim 21 wherein said metal cation source is barium hydroxide, strontium hydroxide or lead nitrate.

24. The process of claim 22 wherein said oxide is dissolved by combining it with sulfuric acid and ammonium sulfate and heating followed by the addition of water.

25. The process of claim 22 wherein said oxide is bismuth oxide which is dissolved in an aqueous nitric acid.

26. The process of claim 21 wherein said metal oxide is zirconium oxide.

27. The process of claim 21 wherein said metal oxide is bismuth oxide.

28. The process of claim 21 wherein said metal oxide is copper oxide.

29. The process of claim 21 wherein said metal oxide is tin oxide.

30. The process of claim 21 wherein said metal oxide is iron oxide.

31. The process of claim 21 wherein said metal cation source is barium hydroxide.

32. The process of claim 21 wherein said metal cation source is strontium hydroxide.

33. The process of claim 21 wherein said metal cation source is lead nitrate.

34. The process of claim 21 wherein the metal of said metal cation source is barium, strontium, or lead.

35. The process of claim 21 wherein said metal oxide is bismuth oxide or copper oxide, or tin oxide, or iron oxide, and wherein the metal of said metal cation is lead or strontium.

* * * * *